Nov. 30, 1948.  H. E. PEREZ  2,455,089
WINDSHIELD WIPER MOTOR
Filed Nov. 29, 1945  2 Sheets-Sheet 1
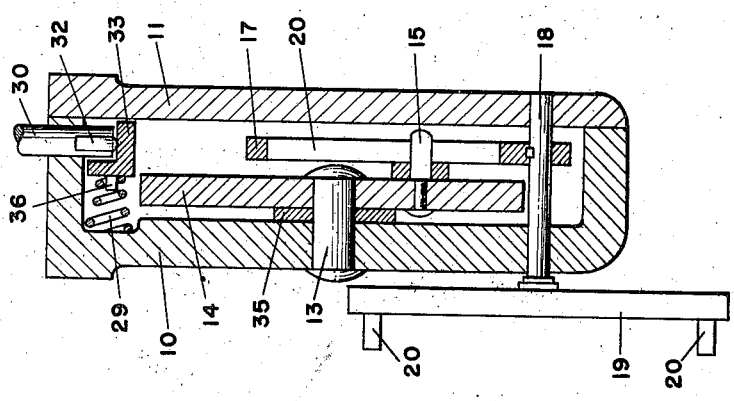
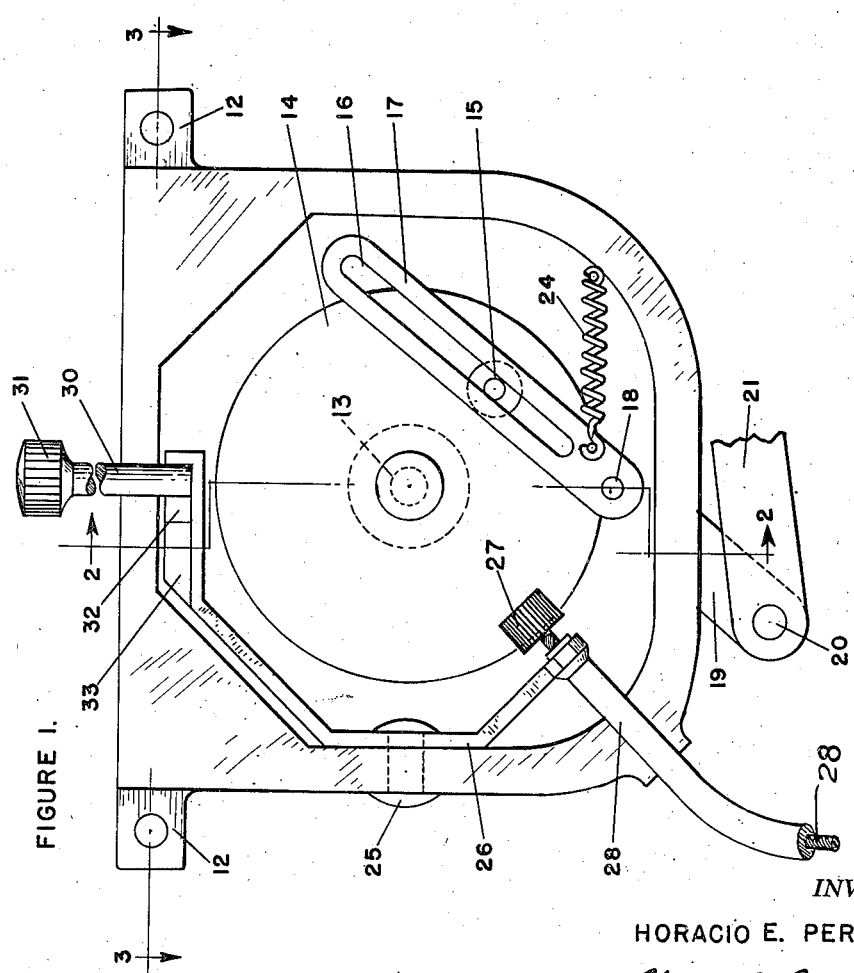
*INVENTOR.*
HORACIO E. PEREZ
ATTORNEYS Nov. 30, 1948.  H. E. PEREZ  2,455,089
WINDSHIELD WIPER MOTOR
Filed Nov. 29, 1945  2 Sheets-Sheet 2

INVENTOR.
HORACIO E. PEREZ
BY *Victor J. Evans & Co.*
ATTORNEYS

Patented Nov. 30, 1948

2,455,089

UNITED STATES PATENT OFFICE 2,455,089

WINDSHIELD WIPER MOTOR

Horacio E. Perez, Valhalla, N. Y.

Application November 29, 1945, Serial No. 631,607

5 Claims. (Cl. 74—70)

The invention relates to a windshield driving device, and more especially to a windshield wiper motor.

The primary object of the invention is the provision of a device of this character, wherein it is operated by power directly derived from an engine through a flexible cable similar to that used in association with speedometers, and through this direct mechanical drive it has constant speed with sufficient power to handle heavy blades constituting wipers for a windshield installed in aeroplanes where the increased wind pressure prevents the use of ordinary windshield wipers, yet the device is equally adaptable for use in automobiles, there being no stopping or slowing down action on hills nor interference with the vacuum of the engine.

Another object of the invention is the provision of a device of this character, wherein the need for a booster pump or the like is avoided, and a direct positive drive is had from the motor unit of the vehicle in which the device is installed, the said device being of novel construction, and is unique in the arrangement of parts, these few in number, thus economical in the cost for repairs or replacement of new parts and their assembly.

A further object of the invention is the provision of a device of this character wherein the construction thereof is such that its size, location of parts and attachments are similar to those of wiper motors now in use therefore eliminating any changes to be made on the vehicle on which it is to be used, and the springs incorporated in its structure will automatically make adjustments for wear.

This is an important advantage over the present type of mechanical wipers now in use since it will permit the use of this wiper on all cars in production at the present time.

A still further object of the invention is the provision of a device of this character, which is simple in construction, thoroughly reliable and efficient in operation, strong, durable, readily and easily applied, entirely noiseless if properly constructed and assembled, positive in operation, automatic in the working thereof, and inexpensive to manufacture and install.

With these and other objects in view the invention consists in features of construction, combination and arrangement of parts as will be hereinafter set forth in detail, illustrated in the accompanying drawings, which disclose the preferred embodiment of the invention, and pointed out in the claims hereunto appended.

In the accompanying drawings:

Figure 1 is an elevation of the device constructed in accordance with the invention and having its front cover or plate removed.

Figure 2 is a sectional view taken on the line 2—2 of Figure 1 looking in the direction of the arrows.

Similar reference characters indicate corresponding parts throughout the several views in the drawings.

Figure 3:
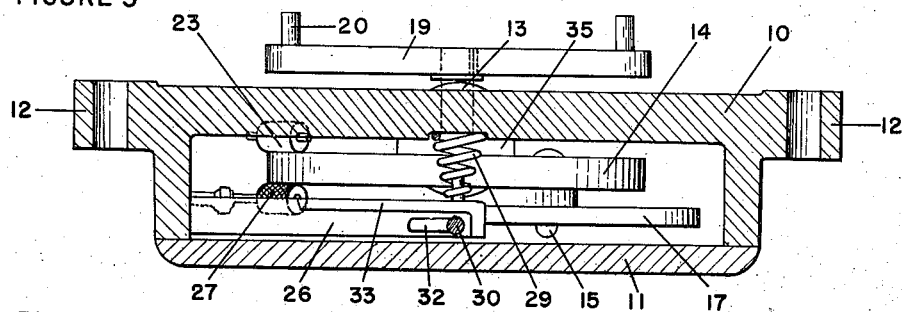
Figure 3 is a sectional view taken on the line 3—3 of Figure 1, looking in the direction of the arrows.
Figure 4:
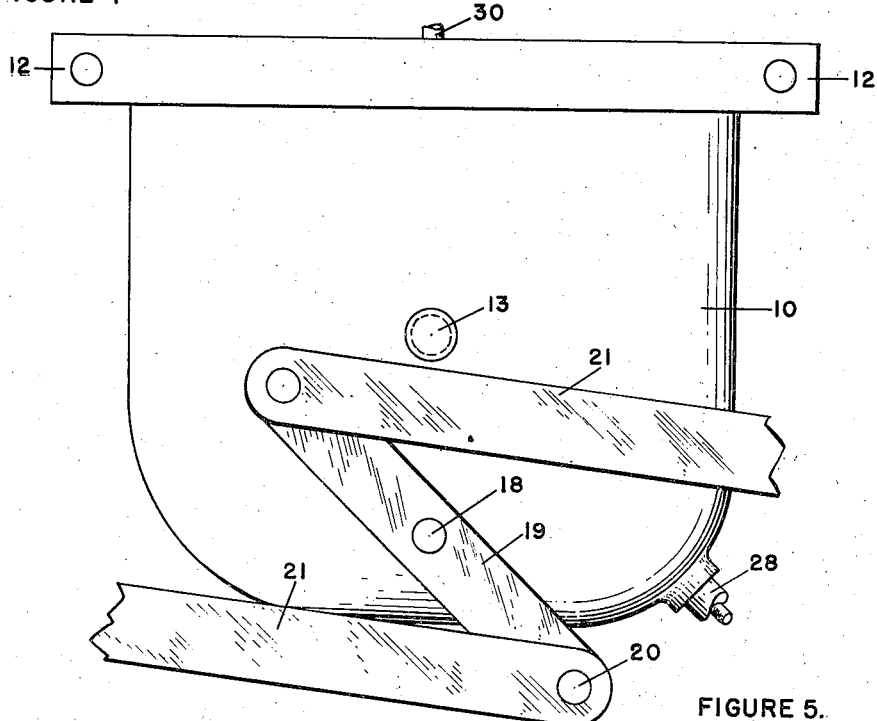
Figure 4 is a rear face view of the device.

Referring to the drawings in detail, the device constituting the present invention, comprises a housing or casing 10 of the required shape and size, having a removable front cover or plate 11 held in closing position in any suitable manner, while the housing or casing 10 is fastened in place by fasteners, not shown, engaged in mounting ears 12, which are located at opposite ends of such housing or casing.

Figure 6:
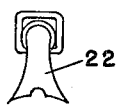
Figure 6 is an end view of a wiper blade for use with the device.

Journalled centrally in the housing or casing 10 is a stub axle 13, which protrudes within and without this casing or housing, and within the latter upon this axle 13 is a disk-like rotatably driven wheel 14 having an eccentrically arranged wrist pin 15 loosely engaged in an elongated slot 16 provided in a rocking arm 17 fixed to a rocking shaft 18, the latter being suitably journalled in the back portion and front cover plate 11 of the casing or housing 10, and has one end projected out of the former. The wheel 14 in its rotary motion imparts a rocking action on the arm 17, and such latter motion is transferred to the shaft 18. On the outer end of the shaft 18 is a cross link 19, which at its outer ends through pivots 20 has connection with throw levers, a portion of each being indicated at 21, and these levers are operatively connected to swingable windshield wipers, a mutilated one being denoted at 22, and is of a heavy duty type. A cross section of such wiper is shown in Figure 6. This particular form of blade provides four lines of contact with the windshield, when sufficient pressure is extended on the blade thus giving clearer vision in all kinds of weather. The levers 21 reciprocate in the operation of the windshield wipers for the working thereof.

Rotatably mounted in the seat 37 in the casing or housing 10 for contact by the wheel 14 is an idle roller 23, having stub axles 38 which are journaled in their respective seats 39.

The roller 23 maintains proper alignment of the wheel 14 regardless of the pressure exerted thereon by driving pin 27 and a washer 35 properly spaces the wheel 14 from the housing 10 and prevents binding of the wheel 14 thereon. Connected to the rocking arm 17 is a coiled tensioning spring 24, which is suitably anchored to the said casing or housing and functions to return arm 17 to the normal position shown in Figure 1 whenever the motion of the blades is stopped. Thus the tension spring 24 is of sufficient strength to return arm 17 to the normal position as shown, whenever contact between pin 27 and wheel 14 is broken. Therefore by proper arrangement the wiper blades will always stop against the edge of the windshield and out of the line of vision.

Movably supported on a pivot 25 within the casing or housing 10 is a substantially bell-shaped lever 26, which is designed to shift transversely with respect to the wheel 14, and fitted to one end of such lever 26 is a rubber coated pin 27 adapted to be brought into and out of contact with the wheel 14 adjacent to the periphery thereof, when the lever 26 is manually operated. Pin 27 being covered with rubber or a similar soft material has a high coefficient of frictional contact with the wheel 14. The pin 27 is driven from a flexible power transmission shaft 28, which is operated by power directly derived from an engine, not shown, constituting the power unit for an aircraft or automobile.

The lever 26 at its end remote from the pinion 27 is acted upon by a compression spring 29, which should be of sufficient strength to maintain adequate contact between the pin 27 and wheel 14, when thrown to engaging position therewith. Therefore spring 29 creates sufficient pressure to cause the wheel 14 to be driven by the pinion 27. The lever 26 at this remote end is controlled by a hand actuated bit-key 30, which has its stem projected vertically without the casing or housing 10 at the top thereof for convenient access, and such stem carries a finger knob 31, the bit 32 of the key 30 being engageable with an abutment flange 33 on the lever 26, so that when the key is turned, a quarter-turn only, the said lever 26 can be actuated to throw the pin out of engagement with the wheel 14, and in this manner stop the operation of the device for the working of the windshield wipers, either singly or doubly equipped in the vehicle. A pin 36 on the abutment 33 maintains the spring 29 in operative relation with the lever 26.

Figure 7:
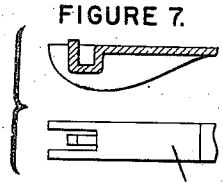
Figure 7 is a fragmentary exploded top view and a cross sectional view of the wiper arm.
Figure 5:
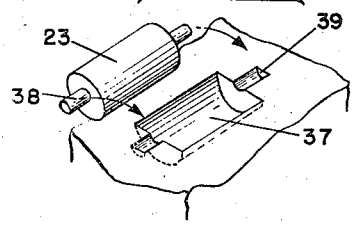
Figure 5 is an exploded perspective view of the roller assembly used to maintain proper alignment of the operating wheel.
Figure 8:
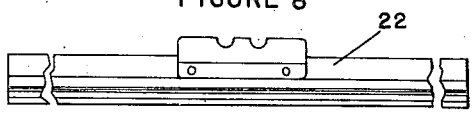
Figure 8 is a mutilated side view of the wiper, per se.

In Figure 7 of the drawings there is shown a portion of the wiper arm 34 for the wiper blade 22 before described, and such an arm 34 is of the usual well known construction, it being connected to the blade in a suitable manner or as is now commonly done.

The shaft 28 can be so mounted that it will be rotated by a fan belt, not shown, or if desired, it can be connected to a flywheel of the motor unit, not shown, and in this connection operates similarly to the flexible cable used for speedometers, not shown, as installed in motor vehicles. Thus it is apparent that the device is operated by power directly derived from a vehicle motor unit, and has constant speed with sufficient power to handle heavier blades as installed in aeroplanes where the increased wind pressure prevents the use of the ordinary windshield wipers. When used in a motor vehicle there is no stopping or slowing down of the device on hills nor interference with the vacuum of the motor, and the service of a booster pump is dispensed with entirely under such uses. Moreover, this device, if properly constructed, is entirely noiseless in operation.

What is claimed is:

1. A device of the kind described, comprising a housing, a disk-like rotary element journalled in said housing, a wrist pin eccentrically arranged on the element, a rocking arm supported in the housing and having an elongated slit engaged by the pin, a rocking link exteriorly of the housing and actuated by the rocking arm, a throw lever pivoted to the link, rotatable power means movable into and out of contact with the element, and manually operated means for moving the power means into and out of engagement with the said element.

2. A device of the kind described, comprising a housing, a disk-like rotary element journalled in said housing, a wrist pin eccentrically arranged on the element, a rocking arm supported in the housing and having an elongated slit engaged by the pin, a rocking link exteriorly of the housing and actuated by the rocking arm, a throw lever pivoted to the link, rotatable power means movable into and out of contact with the element, manually operated means for moving the power means into and out of engagement with the said element and a hand actuator carried by the housing for the manually operated means.

3. A device of the kind described, comprising a housing, a disk-like rotary element journalled in said housing, a wrist pin eccentrically arranged on the element, a rocking arm supported in the housing and having an elongated slit engaged by the pin, a rocking link exteriorly of the housing and actuated by the rocking arm, a throw lever pivoted to the link, rotatable power means movable into and out of contact with the element, manually operated means for moving the power means into and out of engagement with the said element, a hand actuator carried by the housing for the manually operated means, and aligning means cooperating with the element.

4. The invention as in claim 3, wherein means is provided for returning said rocking arm to a pre-selected position.

5. The invention as in claim 3, wherein means is provided for maintaining said power means in contact with said element.

HORACIO E. PEREZ.

REFERENCES CITED

The following references are of record in the file of this patent:

UNITED STATES PATENTS

| Number | Name | Date |
|---|---|---|
| 996,435 | Townsend | June 27, 1911 |
| 1,270,197 | Parker | June 18, 1918 |
| 2,080,129 | Gulotta | May 11, 1937 |
| 2,144,024 | La Brie | Jan. 17, 1939 |
| 2,325,602 | Gay | Aug. 3, 1943 |